Oct. 29, 1963    R. W. WILSON    3,108,551
FURROW OPENER FOR TRANSPLANTER IMPLEMENT OR THE LIKE
Filed May 24, 1960    2 Sheets-Sheet 1
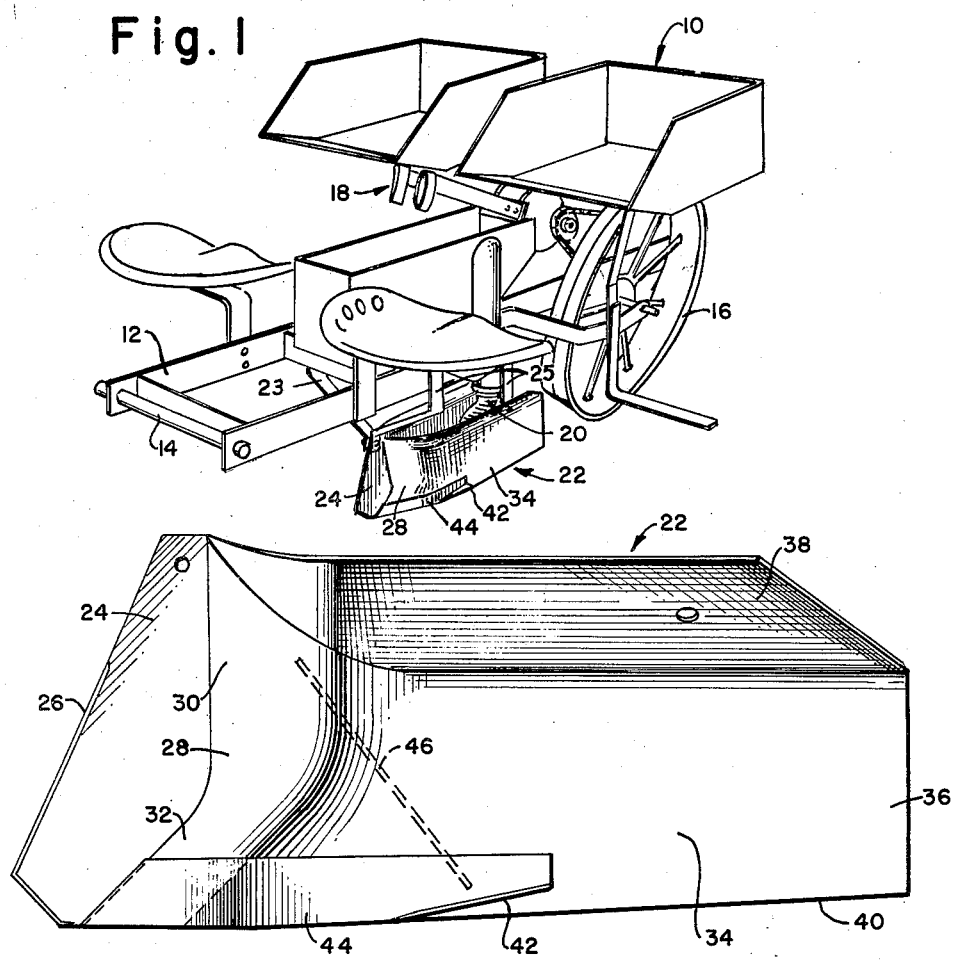
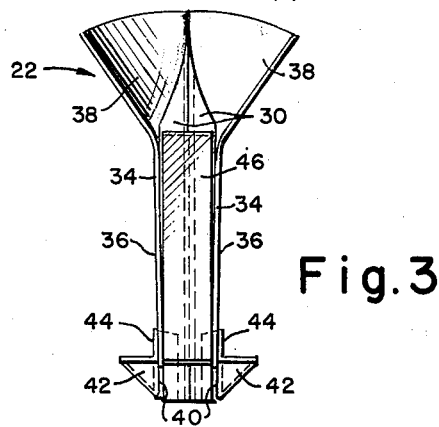
INVENTOR
ROBERT W. WILSON
BY Cushman, Darby & Cushman
ATTORNEYS Oct. 29, 1963            R. W. WILSON            3,108,551

FURROW OPENER FOR TRANSPLANTER IMPLEMENT OR THE LIKE

Filed May 24, 1960            2 Sheets-Sheet 2

INVENTOR
ROBERT W. WILSON

BY *Cushman, Darby & Cushman*

ATTORNEYS

United States Patent Office 3,108,551
Patented Oct. 29, 1963

1

3,108,551
FURROW OPENER FOR TRANSPLANTER
IMPLEMENT OR THE LIKE
Robert W. Wilson, Charlotte, N.C., assignor to R. H. Bouligny, Inc., Charlotte, N.C., a corporation of North Carolina
Filed May 24, 1960, Ser. No. 31,412
5 Claims. (Cl. 111—3)

This invention relates to furrow openers and more particularly to furrow openers of the type adapted for use with transplanting implements.

Furrow openers of conventional construction have been employed in connection with transplanting implements for many years. While the prior art furrow openers have been satisfactory, in certain soil conditions they present problems of penetration, water absorption and proper soil environment for the plants. The conventional furrow opener includes either a blunt-nose or a rounded-nose runner at the forward end thereof, a wedge section which slopes downwardly and rearwardly from the runner, straight sidewall sections extending from the wedge section having clearance on the lower edges thereof either by upwardly tapering or notching out the lower edges of the sidewalls. These furrow openers obtain adequate soil penetration where the condition of the soil is soft. However, where the condition of the soil is very firm considerable weight must be placed on the packer wheels of the transplanter implement in order to obtain adequate penetration of the opener. The necessity of providing additional weight to the packer wheels detrimentally affects the manner in which the plant is placed in the soil.

Additional weight must be supplied to obtain adequate penetration in very firm soils due to the fact that the wedge section of the conventional opener exerts a force on the soil in an outward and downward direction. This action of the conventional furrow opener on the soil also serves to pack the sidewalls of the furrow to such an extent that it is difficult, particularly in very firm soils, to obtain proper absorption of the water distributed to the plant by the transplanting implement. Moreover, because of the packed condition of the sides of the furrow formed by conventional openers, the covering on the plants after they have been placed in the furrow is often detrimentally affected by the creation of air pockets adjacent the plant, which pockets are formed as a result of the firmness of the sidewalls of the furrow and the fact that the soil moved into the furrow by the packer wheels is not loose enough to engage within the entire volume of the furrow thus formed.

An object of the present invention is the provision of a furrow opener which has improved penetration characteristics, particularly in very firm soil, and is operable to form a furrow with relatively loose sidewalls so that when the plant is deposited in the furrow, the water applied thereto will be absorbed more easily and in a greater area surrounding the plant roots, and so that the soil can be easily packed into the furrow by the packer wheels after the plant has been deposited and watered.

Another object of the present invention is the provision of a furrow opener of the type described having a wedge section of an improved construction embodied therein, such wedge section enhancing the soil penetration characteristics of the opener.

Still another object of the present invention is the provision of a furrow opener of the type described having improved wing means extending upwardly and outwardly from the sidewalls thereof so as to loosen the walls of the furrow formed thereby and thus greatly increase the water absorption qualities of the soil within which the plant is deposited.

2

Still another object of the present invention is the provision of a transplanter implement of the type described having an improved furrow opener embodied therein.

These and other objects of the present invention will become more apparent during the course of the following detailed description and appended claims.

The invention may best be understood with reference to the accompanying drawings, wherein an illustrative embodiment is shown.

In the drawings:

FIGURE 1 is a perspective view of a transplanter implement employing a furrow opener embodying the principles of the present invention;

FIGURE 2 is a side elevational view of the furrow opener;

FIGURE 3 is a rear elevational view of the furrow opener;

Figure 4:
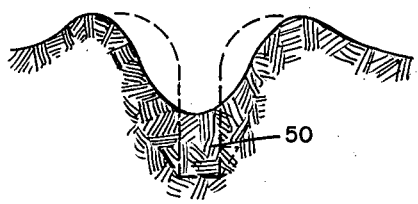
FIGURE 4 is a cross-sectional view of a furrow formed by the furrow opener of the present invention prior to engagement thereof by the packer wheel, the outline of the furrow opener being shown in dotted lines.

Referring now more particularly to FIGURE 1 of the drawings, there is shown therein a transplanter implement, generally indicated at 10. The implement includes the usual component parts such as a frame 12 supported at its forward end by a draw bar or hitch pin 14 and at its rearward end by packer wheels 16, a conventional plant depositing mechanism 18, a conventional plant watering mechanism 20, the latter two of which are arranged to cooperate with a transplanter opener, generally indicated at 22, suitably secured to the frame 14, as by a forward standard 23 and spaced rearward standards 25.

The construction and operation of the transplanter implement apart from the furrow opener 22 are of a conventional nature and form no part of the present invention except insofar as they are combined with the furrow opener to obtain an overall improved result. An example of a transplanter which may be utilized with the present furrow opener is the Powell "42" transplanter, manufactured by The Powell Manufacturing Company, Inc., of Wilson, North Carolina.

Referring now more particularly to FIGURES 2 and 3, the furrow opener 22 of the present invention is preferably made up of two sheets of metal fabricated together to provide a forward blade or sword section 24 having an angular forward edge 26 which extends downwardly and forwardly from the upper end thereof and then downwardly and rearwardly adjacent the lower end thereof. Preferably, the lower portion of the edge 26 which is arranged to engage within the ground is sharpened to permit easier penetration. It will be understood that the edge 26 may be rounded, if desired, rather than angular as shown.

Extending rearwardly from the blade or sword section 24 of the furrow opener is a wedge section 28. The portion of the two sheets of metal shaped to form the wedge section define two wedge walls which diverge rearwardly from the blade section 24. The wedge walls include upper portions 30 which extend substantially vertically and lower portions 32 which extend downwardly and forwardly from the upper portions at an angle of the order of 45°.

Extending rearwardly from the wedge section 28 is a side wall section 34. The portion of the two sheets of metal shaped to define the side wall section 34 define spaced side walls having lower portions 36 which are substantially parallel with respect to each other and flared upper portions 38 which extend upwardly and outwardly from the upper edges of the lower side wall portions 36 and the upper edges of the upper wedge portions 30. The lower edge of the lower side wall portions 36 are relieved by tapering the same upwardly and rearwardly, as indicated at 40. However, it will be understood that such relief may also be provided by upwardly stepping the lower edge 40, if desired, rather than tapering the same as shown.

The present furrow opener also includes a pair of wings 42 extending laterally outwardly from the lower side wall portions 36 at a lower central position thereon. As shown, each wing 42 is formed from a strap 44 of metal or the like suitably welded or otherwise fixed adjacent the lower marginal edge of the associated lower wedge portion 32 and lower side wall portion 36. Each wing 42 is formed from the strap by bending upwardly and outwardly the corner thereof, thus providing the wing with a substantially triangular shape in plan. Each wing is disposed in a plane extending transversely of the furrow opener an angle of approximately 90° and with respect to a horizontal plane passing through the apex of the wing an angle of approximately 11°. It will be understood that due to the triangular configuration of the wing in plan and the disposition of the same in the plane mentioned above, the outer edge thereof diverges upwardly and rearwardly from the surface of the associated lower side wall portion 36.

It will be understood that while the wings are shown in the drawings as being formed from a strap welded to the sheets forming the body of the furrow opener, such wings may be provided by other structures, as for example, butt welding triangular pieces directly to the side walls or bending up a triangular portion of the side walls themselves to form the wing. The construction as shown is preferred since it has the effect of providing additional resistance to wear at the points on the furrow opener subject to the greatest wear.

Any suitable means may be provided between the side walls to maintain them in rigidly spaced relation, as for example, a rearwardly and downwardly extending strap 46 welded between the side wall section 34 adjacent the wedge section 28.

In operation, it will be noted that the lower portions 32 of the wedge section 28 engage the soil so as to exert an upward and outward force thereon. A similar action is provided by the wings 42 at positions spaced outwardly of the wedge section. This action serves to increase the penetration characteristics of the present furrow opener, particularly in very firm soil conditions. Tests of the present furrow opener in comparison with conventional furrow openers show that the weight required on the packer wheels to effect a constant penetration of the furrow opener increases only slightly in response to the increase in firmness of the soil, whereas this weight increase in response to increase in soil firmness in conventional openers is quite pronounced. Thus, with the present furrow opener the forces of the soil acting upon the surfaces of the opener engaged thereby do not tend to lift it out of the ground nearly as much as is the case with conventional openers. Consequently, in very firm soil conditions where this characteristic detrimentally affects the operation of conventional openers, the present opener gives a much more satisfactory transplanting job.

Figure 5:
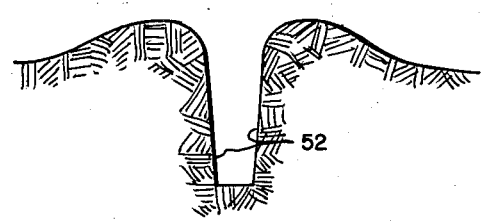
FIGURE 5 is a view similar to FIGURE 4 showing the cross-sectional configuration of a furrow formed by a conventional furrow opener prior to the engagement of the packer wheels therein.

The action of the wings 42 on the soil at positions outwardly of the wedge sections and side wall sections serves to break up the soil and prevent undue packing of the soil in the sides of the furrow during operation as is often the case with conventional openers. Referring to FIGURE 4, it can be seen that because of the loosening effect of the wings 42 the side walls of the furrow being formed are sufficiently loose that the soil will fall to the bottom of the furrow, as indicated at 50, after the opener has passed and prior to the passage of the packer wheels 16 thereover. In contradistinction to this condition of the furrow as formed by the present opener, a conventional opener operates on the soil to so pack the side walls thereof, as indicated at 52 in FIGURE 5, so that there is virtually no falling of soil into the bottom of the furrow between the passage of the opener and the passage of the packer wheels.

Figure 6:
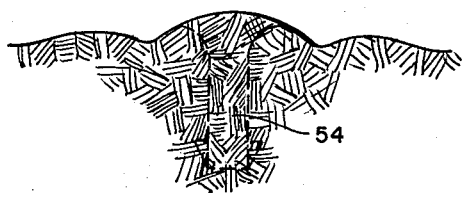
FIGURE 6 is a cross-sectional view of a covered furrow formed by the furrow opener of the present invention after the packer wheels have passed thereover, the outline of the furrow former being shown in dotted lines.
Figure 7:
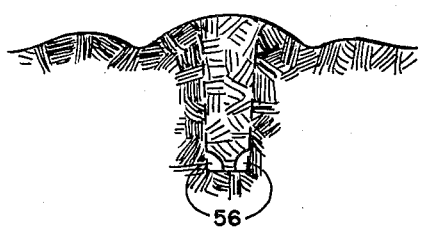
FIGURE 7 is a view similar to FIGURE 6 of a covered furrow formed by a conventional furrow opener.

With a loose soil condition as illustrated in FIGURE 4, a much more efficient packing of the soil into the furrow by the packer wheels can be obtained. FIGURE 6 illustrates the condition of the furrow after the passage of the present furrow opener and the packer wheels. It will be noted that the entire space originally occupied by the furrow opener is evenly filled with relatively loose soil, as indicated at 54. FIGURE 7 illustrates a condition which often exists after the passage of a conventional furrow opener and packing wheel. With the walls of the furrow packed to the condition shown in FIGURE 5, the packing wheels must deposit sufficient soil in the furrow to close the same and the wheels are acting on soil which has been packed by the opener. Consequently there is often left void spaces which are not filled by soil, as indicated at 56.

Figure 8:
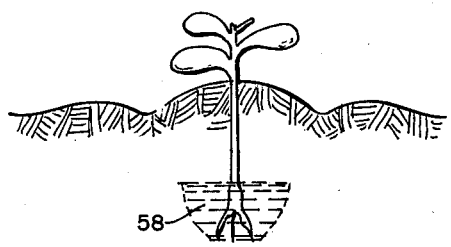
FIGURE 8 is a cross-sectional view showing a plant deposited in a covered furrow and the distribution of water around the roots of the plant when utilizing the furrow opener of the present invention.
Figure 9:
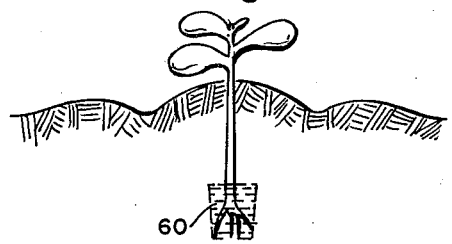
FIGURE 9 is a view similar to FIGURE 8 showing the distribution of the water about the roots of the plant when utilizing a conventional furrow opener.

The advantages to the plant deposited in the furrow are apparent by reference to FIGURE 8. Thus, because the side walls of the furrow have not been packed to any great extent, but on the contrary maintained in a somewhat loose condition and the soil used to cover the furrow is likewise in a relatively loose condition, the soil adjacent the plant roots will be maintained in a loose condition and thus permit a greater absorption throughout a greater area of the water deposited by the transplanting implement. With the present furrow opener transplanter water is allowed to flow under the side wall edge 40 and mix with the loose soil coming off of the end of the wings so that the water is absorbed throughout a substantial area around the plant roots, as indicated at 58 in FIGURE 8. Actual field tests have shown an increased water absorption of 90% over the absorption obtained by the use of conventional furrow openers under all soil conditions whether loose or firm. This increased absorption occurs mainly in the soil at the sides of the furrow loosened by the wings. With a conventional furrow opener the bottom is resisted to a considerable extent, as indicated at 60 in FIGURE 9. It is also evident that the conditions illustrated in FIGURE 7 will also detrimentally affect the water distribution around the roots of the plants in that the soil which fills the furrow is more compacted and the void spaces also do not promote proper distribution.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a transplanter including a frame having hitch means adjacent its forward end and packer wheel means supporting the rearward end thereof, a furrow opener mounted in depending relation from said frame in a position in advance of and in general longitudinal alignment with said packer wheel means, means on said frame for depositing successive plants in the furrow formed by said opener prior to the passage thereover by said packer wheel means, and means on said frame for delivering a quantity of water to each plant deposited in the furrow by said plant depositing means, the improvement which comprises said furrow opener comprising a blade section having a cutting edge formed on the forward edge thereof, a wedge section providing opposed rearwardly diverging surfaces extending rearwardly from said blade section, a side wall section providing substantially planar opposed lower surfaces extending rearwardly from the diverging surfaces of said wedge section, and a pair of outwardly disposed wings secured to said side wall section providing surfaces extending upwardly and rearwardly adjacent the lower portion of the opposed lower surfaces of said side wall section.

2. A furrow opener comprising a pair of metal plates formed to provide
  (1) a forward blade section having a cutting edge extending from the upper end thereof downwardly and forwardly and then downwardly and rearwardly,
  (2) a wedge section disposed rearwardly adjacent said blade section having rearwardly diverging upper portions extending generally vertically and rearwardly diverging lower portions extending downwardly and forwardly from said upper portions, and
  (3) a side wall section disposed rearwardly adjacent said wedge section having generally parallel lower side wall portions extending rearwardly from said upper and lower wedge portions and upwardly and outwardly diverging upper portions extending upwardly from said lower side wall portions and the upper edge of said upper wedge portions,
the lower edges of said lower side wall portions being rearwardly relieved and
a pair of outwardly disposed wings extending upwardly and rearwardly from the lower side wall portions within a lower central position thereon.

3. A furrow opener as defined in claim 2 wherein said lower wedge portions extend downwardly and forwardly at an angle of approximately 45° with respect to a horizontal plane passing through the lower extremity of said wedge portions when said furrow opener is disposed in operative position.

4. A furrow opener as defined in claim 2 wherein each of said wings is substantially triangular and disposed in a transverse plane extending upwardly and rearwardly at an angle of the order of 11° with respect to a horizontal plane passing through the apex of the wing when the furrow opener is disposed in operative position.

5. A furrow opener as defined in claim 4 wherein each of said wings comprises an outwardly bent corner of an elongated strap rigidly secured adjacent the lower edge of the associated lower wedge portion and lower side wall portion.

References Cited in the file of this patent
UNITED STATES PATENTS

| | | |
|---|---|---|
| 244,346 | Watson | July 12, 1881 |
| 709,636 | Hoyt | Sept. 23, 1902 |
| 1,284,162 | Tyson | Nov. 5, 1918 |
| 1,693,318 | Shell | Nov. 27, 1928 |
| 2,216,923 | Poll | Oct. 8, 1940 |
| 2,619,054 | Bell | Nov. 25, 1952 |
| 2,768,591 | James | Oct. 30, 1956 |
| 2,815,725 | Hanson | Dec. 10, 1957 |
| 2,884,880 | Miller | May 5, 1959 |
| 2,904,119 | Hunter | Sept. 15, 1959 |
| 2,988,026 | Heckathorn | June 13, 1961 |

FOREIGN PATENTS

| | | |
|---|---|---|
| 1,199,014 | France | June 15, 1959 |
| 481,102 | Germany | Aug. 14, 1929 |

OTHER REFERENCES

John Deere Manual OM–W30–1054 (received in the Patent Office Nov. 24, 1954, pages 2 and 4 relied on).